United States Patent [19]

Ponticelli

[11] Patent Number: 4,873,936
[45] Date of Patent: Oct. 17, 1989

[54] SWITCHING MECHANISM FOR ANTI-THEFT SYSTEM

[76] Inventor: Robert J. Ponticelli, 20274 Delita Dr., Woodland Hills, Calif. 91364

[21] Appl. No.: 265,404

[22] Filed: Oct. 31, 1988

[51] Int. Cl.[4] .............................................. B60R 27/00
[52] U.S. Cl. ........................................ 116/33; 116/6; 340/426; 340/568
[58] Field of Search ................ 116/33, 6, 7; 340/568, 340/426; 200/43.07, 43.19, 43.21, 51.09, 51.1, 573

[56] References Cited

U.S. PATENT DOCUMENTS

| | | | |
|---|---|---|---|
| 561,107 | 6/1896 | Goucher | 200/43.07 |
| 1,726,053 | 8/1929 | Brown | 200/51.1 |
| 3,728,674 | 4/1973 | Kahn | 340/426 |
| 3,781,857 | 12/1973 | Stendig et al. | 340/568 |
| 4,047,167 | 9/1977 | Helena | 340/568 |
| 4,137,521 | 1/1979 | Martinez | 340/568 |
| 4,211,995 | 7/1980 | Smith | 340/426 |
| 4,520,243 | 5/1985 | McIntyre | 200/51.09 |
| 4,531,116 | 7/1985 | Takagi et al. | 340/568 |
| 4,679,026 | 7/1987 | Knakowski et al. | 340/568 X |

FOREIGN PATENT DOCUMENTS

| | | | |
|---|---|---|---|
| 2606911 | 5/1988 | France | 116/17 |
| 59403 | 5/1938 | Norway | 200/43.07 |

Primary Examiner—William A. Cuchlinski, Jr.
Assistant Examiner—Jeffrey J. Hohenshell
Attorney, Agent, or Firm—Edward A. Sokolski

[57] ABSTRACT

An electrical switching mechanism has a pair of arcuate spring contact members which are mounted in a casing. An aperture is formed in the casing for receiving an actuator member which may comprise a screw or other similar actuator member. A camming member is slidably mounted in the casing with one portion thereof abutting against one of the spring contact members. The camming member is urged by the spring contact member such that it is resiliently urged towards the aperture. The spring contact members are retained in the casing by means of casing guide elements in a position such that when a screw or other member is inserted in the aperture, the camming member is urged outwardly by the screw so that it retains its associated spring contact member in a non contact position with the other spring contact member. When the screw is removed from the aperture, the first mentioned spring contact member drives the camming member into the aperture with the two spring contacts being permitted to come into contact with each other. The switching mechanism can be used in an alarm system to provide a warning when the screw is removed in an attempt to steal a piece of equipment held thereby.

7 Claims, 2 Drawing Sheets

SWITCHING MECHANISM FOR ANTI-THEFT SYSTEM

This invention relates to anti-theft warning systems and more particularly to a switching mechanism for use in such a system.

Anti-theft warning systems have been developed providing warning alarms when an unauthorized person attempts to steal a vehicle or equipment which may be installed in a vehicle or elsewhere. Such systems generally employ a switching device which is actuated when either a vehicle is entered or an attempt is made to remove equipment, this switching device operating an alarm device which generates a warning signal. Many of the switching mechanisms of prior art systems tend to be overly expensive in their construction. Further, many do not provide proper protection against theft of equipment installed in a vehicle that they only protect against entrance into the vehicle such that should one inadvertently leave the vehicle open or should the keys be left with an untrustworthy person, it is still possible that the equipment could be removed without setting off an alarm.

The device of the present invention obviates the aforementioned shortcomings of the prior art in that it provides a simple, highly economical switching device which is installed in conjunction with one or more mounting screws, bolts or other hardware for mounting equipment. The removal of any such screws or other mounting hardware in an attempt to steal the equipment will result in the actuation of an alarm. Thus protection is provided for the equipment even if the vehicle has been entered without actuating an alarm.

The device of the present invention achieves this end result by employing a casing having a pair of spring contact members retained therein. The casing has an aperture therethrough through which mounting hardware such as a screw for the equipment to be protected is inserted. A camming member is slidably mounted in the casing with a portion thereof being urged by one of the spring contacts against said mounting hardware and into said aperture when the hardware is removed. With the hardware inserted in the aperture, the spring contacts are driven apart, while with the hardware removed the contacts are closed to actuate the alarm.

It is therefore an object of this invention to provide a highly economical and reliable switching device for use in an anti-theft warning system.

It is a further object of this invention to provide a switching device for use in an anti-theft warning system which is actuated when mounting hardware for the equipment is removed.

Other objects of the invention will become apparent as the description proceeds in connection with the accompanying drawings of which:

Figure 1:
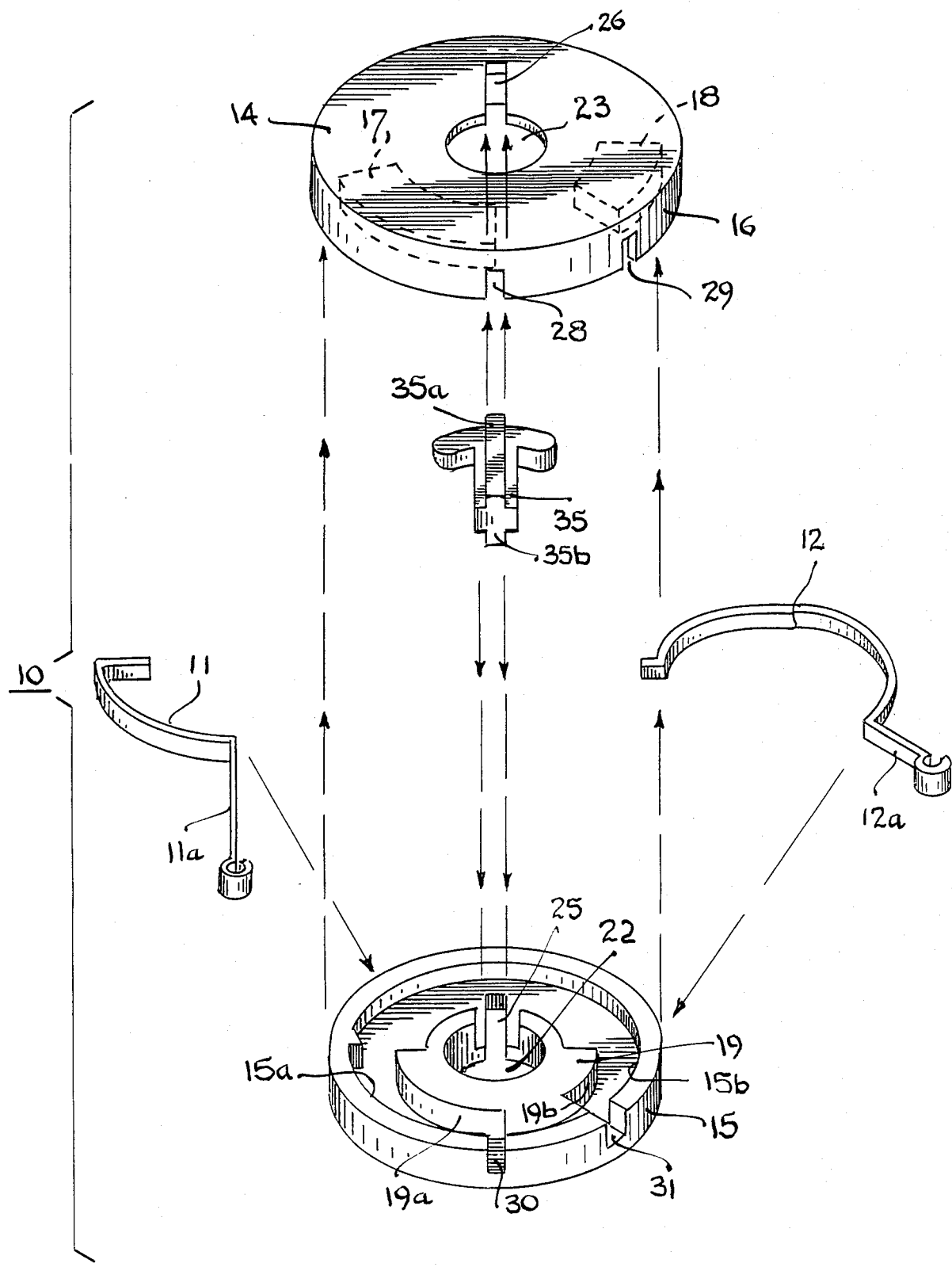
FIG. 1 is an exploded view of a preferred embodiment of the invention.

Referring now to FIGS. 1–4 a preferred embodiment of the invention is illustrated. A pair of arcuate spring contacts 11 and 12 are mounted in casing 14 which is formed by a pair of sections 15 and 16 which fit together one within the other in snap tight relationship to form the composite unit. A pair of guide elements 17 and 18 extend from the inner wall of section 16. Guide element 19 extends from the inner wall of half section 15, this guide element having pair of outer surfaces 19a and 19b which have similar contours and dimensions to those of elements 17 and 18 respectively. Mating apertures 22 and 23 and mating slots 25 and 26 are formed in sections 15 and 16 respectively. Slots 28 and 29 are formed in the side wall of section 16 which mate with corresponding slots 30 and 31 respectively which are formed in the side wall of section 15. A camming member 35 has ridge portions 35a and 35b on the opposite sides thereof which fit into slots 26 and 25 respectively, the camming member being slidably mounted in casing 14 in these slots.

Spring contact member 11 is held in abutment against a portion 15a of the inner wall of section 15 by means of guide element 17 which fits snugly between surface 19a and inner wall portion 15a. Similarly, spring contact member 12 is held in abutment against a portion 15b of the inner wall of half section 15 by means of guide element 18 which fits snugly between surface 19b and inner wall portion 15b. Spring contact members 11 and 12 have straight arm portions 11a and 12a respectively which fit through slots 28, 30 and 29, 31 respectively.

Figure 2:
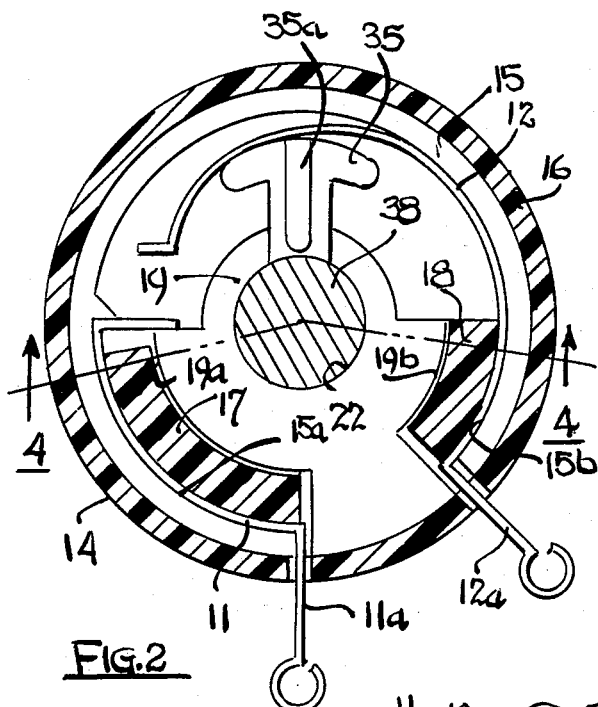
FIG. 2 is a cross sectional view taken along the plane indicated by 2—2 in FIG. 4.
Figure 3:
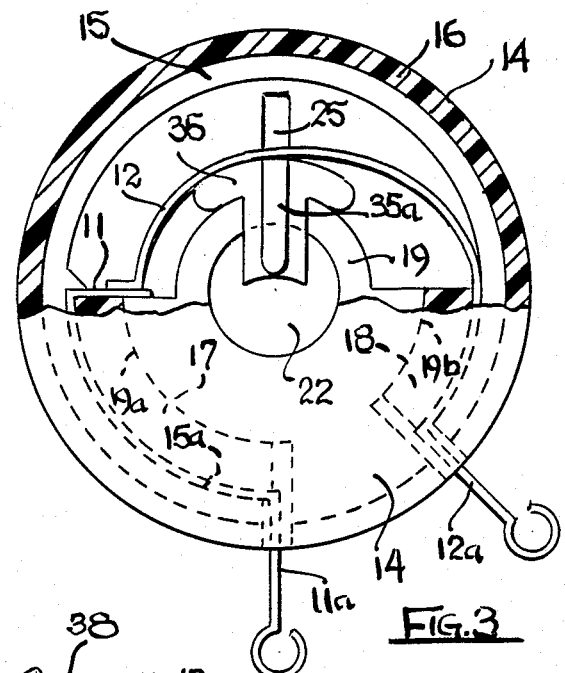
FIG. 3 is a cross sectional view taken along the same plane as that shown in FIG. 2 with the mounting screw removed.
Figure 4:
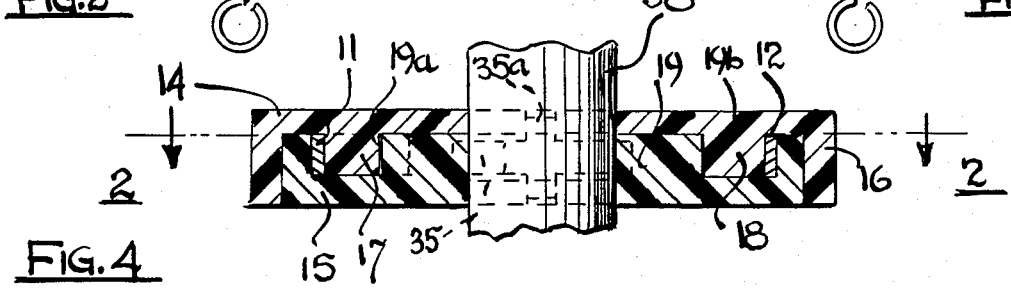
FIG. 4 is a cross sectional view taken along the plane indicated by 4—4 in FIG. 2.

The switch is shown in FIG. 2 with a screw 38 or other mounting hardware for equipment such as a stereo set inserted through apertures 22 and 23. Screw 38 as can be seen abuts against camming member 35 such that the camming member retains spring contact 12 away from electrical contact with spring contact 11. Should screw 38 be removed, as would occur in an attempt to steal the equipment retained thereby, camming member 35 will be slidably driven by spring contact member 12 into aperture 22 thereby permitting contact member 12 to close against contact member 11 as shown in FIG. 3.

Figures 5, 5A, 6:
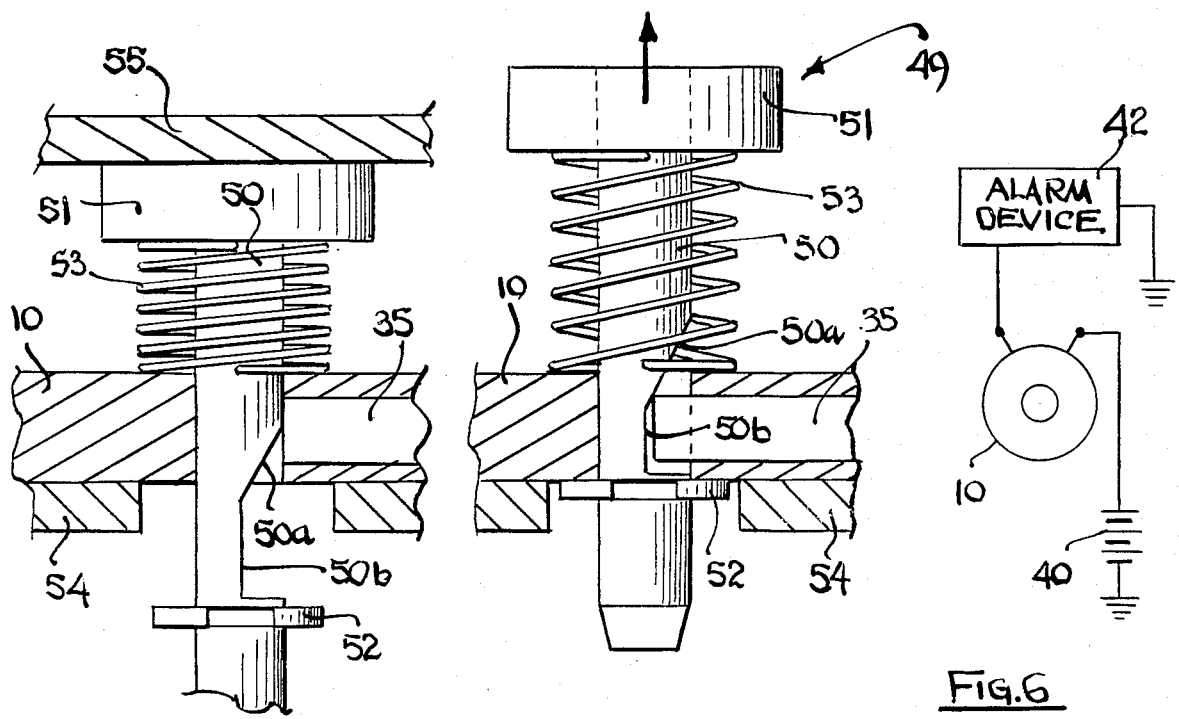
FIG. 5 is an elevational view partially in cross section illustrating the operation of the device of the invention in conjunction with another type of mounting hardware than that shown in FIGS. 1–4.
FIG. 5A is an elevational view partially in cross section showing the mounting hardware of FIG. 5 in its actuating position.
FIG. 6 is a schematic drawing illustrating the operation of the device of the invention in an alarm system.

Referring now to FIG. 6, the installation of a switching device 10 of the type just described in an alarm system is schematically illustrated. When the screw or other mounting hardware for the stereo or other equipment being protected is removed, as just described in connection with FIG. 3, the contacts of switching device 10 are closed to provide power from battery 40 to actuate alarm device 42 which may provide an audible or visual alarm or both.

Referring now to FIGS. 5 and 5A the operation of the switching device of the invention in conjunction with a different type of mounting hardware is shown.

Actuator pin 49 has a pin portion 50 with a head 51 on one end and a tapered portion 50a which runs to an indented portion 50b. Actuator pin 49 is slidably installed in switching device 10 with indented portion 50b opposite camming member 35 of the switching device. The actuator pin is retained to the switching device by means of retainer clip member 52 which fits into a slot formed in pin portion 50. The actuator pin is resiliently held to the switching device 10 for slidable motion relative thereto by means of coil spring 53 which is installed between head 51 and the switching device.

As shown in FIG. 5A, when the actuator pin and switching device are installed with the switching device 10 abutting against a casing wall 54 and with mounting trim hardware 55 depressing head 51, camming member 35 is driven by tapered portion 50a to open the switch as shown in FIG. 2. If the trim 55 should be removed, as in a theft attempt, the spring 53 will drive head 51 upwardly to the position shown in FIG. 5 and the switch will be closed as shown in FIG. 3, thereby actuating the alarm.

The type of hardware shown in FIG. 5 can be adapted for use with other types of switch actuating systems. For example, pin 50 can be operated as a string drawn plunger which is actuated by pull motion, etc. Other types of hardware could also be adapted to operate to actuate the switching device.

While the invention has been described and illustrated in detail, it is to be clearly understood that this is intended by way of illustration and example only and is not to be taken by way of limitation, the spirit and scope of the invention being limited only by the terms of the following claims.

I claim:

1. A switching mechanism for use in a theft alarm system for providing an alarm signal when an attempt is made to remove equipment being protected thereby, said alarm system being actuated by providing power from a power source through said switching mechanism to an alarm device when a predetermined piece of hardware is removed from the equipment, said mechanism comprising:
   a casing having an aperture formed therein and extending completely therethrough;
   first and second spring contact members retained in said casing;
   a camming member slidably mounted in said casing;
   said first spring contact member abutting against said camming member and urging said camming member towards said aperture,
   said piece of hardware being fitted into said aperture in abutment against said camming member so as to urge said camming member away from said aperture, thereby retaining said first spring contact member in a first predetermined position;
   the camming member being permitted to be driven by said first spring member into said aperture with said first spring contact member in a second predetermined position;
   said first spring contact member being in contact with said second spring contact member in one of said predetermined positions and not being in contact with said second spring contact in the other of said predetermined positions;
   whereby when said piece of hardware is removed from the equipment, said alarm system is actuated.

2. The mechanism of claim 1 wherein said piece of hardware comprises a screw fitted through said aperture.

3. The mechanism of claim 1 wherein said spring contact members comprise arcuate springs and further including guide elements formed in said casing for positioning said spring contact members in said casing.

4. The mechanism of claim 1 and further including slot means formed in said casing for slidably supporting said camming member.

5. The mechanism of claim 1 wherein said casing is formed in two sections which are fitted together, one within the other, said guide elements including elements in each of said casing sections between which said spring contact members are held.

6. A switching mechanism for use in a theft alarm system for providing an alarm signal when an attempt is made to remove equipment being protected thereby, said alarm system being actuated by providing power from a power source through said switching mechanism to an alarm device when a predetermined piece of hardware is removed from the equipment, said mechanism comprising:
   a casing having an aperture formed therein and extending completely therethrough;
   first and second spring contact members retained in said casing;
   a camming member slidably mounted in said casing;
   said first spring contact member abutting against said camming member and urging said camming member towards said aperture,
   said piece of hardware being fitted into said aperture in abutment against said camming member so as to urge said camming member away from said aperture, thereby retaining said first spring contact member in a position separated from said first spring contact member whereat said switching mechanism does not actuate said alarm system;
   the camming member being permitted to be driven by said first spring member into said aperture with said first spring contact member coming into contact with said second spring contact member to actuate said alarm system when said piece of hardware is removed from the equipment.

7. A switching mechanism for use in a theft alarm system for providing an alarm signal when an attempt is made to remove equipment being protected thereby, said alarm system being actuated by providing power from a power source through said switching mechanism to an alarm device when a predetermined piece of hardware is removed from the equipment, said mechanism comprising:
   a casing having an aperture formed therein;
   first and second spring contact members retained in said casing;
   said casing having slot formed therein through which a portion of each of said spring contact members extends, said portion of one of said spring contact members being connected to said alarm system, said portion of the other of said spring contact members being connected to said power source;
   a camming member slidably mounted in said casing;
   said first spring contact member abutting against said camming member and urging said camming member towards said aperture,
   said piece of hardware being fitted into said aperture in abutment against said camming member so as to urge said camming member away from said aperture, thereby retaining said first spring contact member in a first predetermined position;
   the camming member being permitted to be driven by said first spring contact member into said aperture with said first spring contact member in a second predetermined position;
   said first spring contact member being in contact with said second spring contact member in one of said predetermined positions and not being in contact with said second spring contact in the other of said predetermined positions;
   whereby when said piece of hardware is removed from the equipment, said alarm system is actuated.

* * * * *